(12) United States Patent
Salameh

(10) Patent No.: US 8,025,189 B2
(45) Date of Patent: Sep. 27, 2011

(54) PLASTIC AEROSOL CONTAINER AND METHOD OF MANUFACTURING SAME

(75) Inventor: Asim Salameh, Macquaire Links (AU)

(73) Assignee: Souther Star Corporation, Labuan (MY)

( * ) Notice: Subject to any disclaimer, the term of this patent is extended or adjusted under 35 U.S.C. 154(b) by 989 days.

(21) Appl. No.: 11/723,750

(22) Filed: Mar. 21, 2007

(65) Prior Publication Data

US 2007/0245538 A1   Oct. 25, 2007

Related U.S. Application Data

(63) Continuation-in-part of application No. PCT/AU2006/001614, filed on Oct. 27, 2006, and a continuation-in-part of application No. PCT/AU2005/001474, filed on Sep. 23, 2005.

(30) Foreign Application Priority Data

Sep. 23, 2004 (AU) .............................. 2004 905486
Nov. 3, 2005 (AU) .............................. 2005 906098

(51) Int. Cl.
   *B65D 83/00* (2006.01)
(52) U.S. Cl. ..................................... 222/402.1; 222/394
(58) Field of Classification Search ................. 222/394, 222/402.1, 402.2, 530; 220/613, 616, 619, 220/915
   See application file for complete search history.

(56) References Cited

U.S. PATENT DOCUMENTS

| 3,432,072 | A | * | 3/1969 | Quercia | 220/613 |
| 4,231,489 | A | * | 11/1980 | Malone | 220/304 |
| 4,886,181 | A | * | 12/1989 | Haines | 220/617 |
| 5,083,684 | A | * | 1/1992 | Ebina et al. | 222/394 |
| 5,209,379 | A | * | 5/1993 | Dahlin | 222/401 |
| 5,224,630 | A | * | 7/1993 | Pope et al. | 222/183 |
| 5,460,300 | A | * | 10/1995 | Tritsch | 222/401 |
| 5,553,753 | A | * | 9/1996 | Abplanalp | 222/387 |
| 6,390,326 | B1 | * | 5/2002 | Hung | 220/616 |
| 6,484,900 | B1 | * | 11/2002 | Stiner et al. | 220/662 |

* cited by examiner

*Primary Examiner* — Kevin P Shaver
*Assistant Examiner* — Daniel R Shearer
(74) *Attorney, Agent, or Firm* — Jerald L. Meyer; Derek Richmond; Robert T. Burns

(57) ABSTRACT

A container (1) for dispensing a pressurised product and a method for manufacturing the container. The container (1) includes a body (2), a collar (3) and a dispensing valve (4). The body (2) is moulded from PET or like plastics, and has a shaped neck (7) surrounding an opening. The collar (3) is also moulded of plastics material, and is shaped to be snap-fitted to the shaped neck (7) of the body (2). Alternatively, the collar (3) is shaped to straddle the internal and external walls of the neck (7) of the body (2) to form a shaped lip therearound. The dispensing valve (4) is attached to the neck/collar (7,3), and has an outer flange (11) which is formed of malleable material and is shaped to fit about and be retained by the collar (3).

5 Claims, 21 Drawing Sheets

FIGURE 6
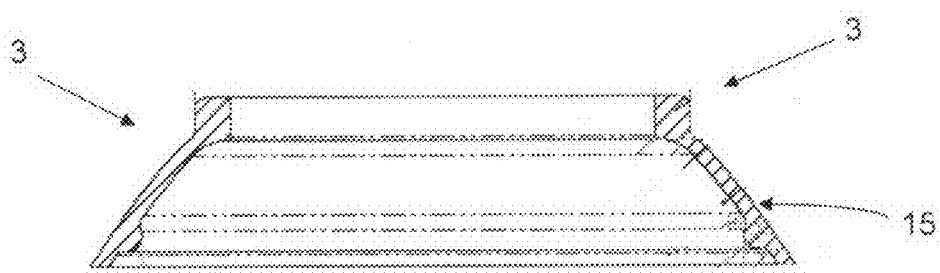
FIGURE 6(a)
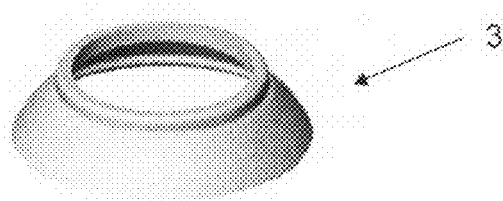
FIGURE 6(b)

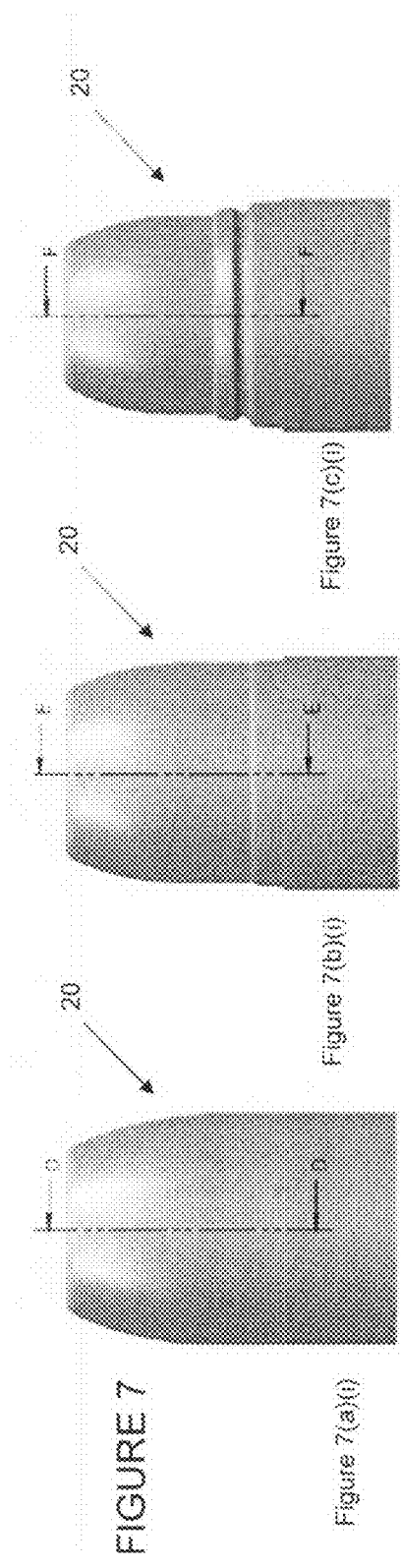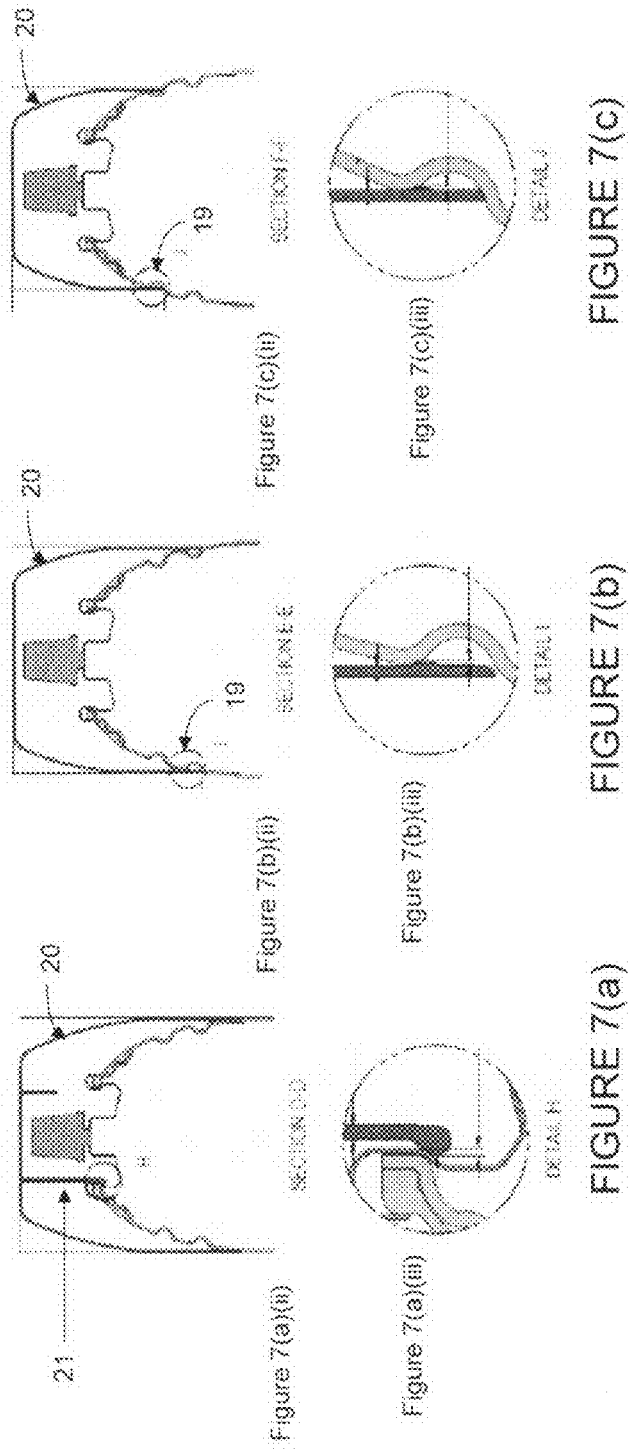

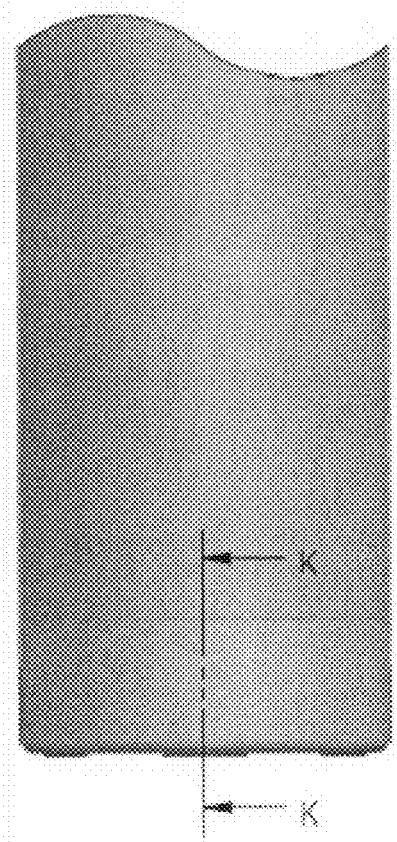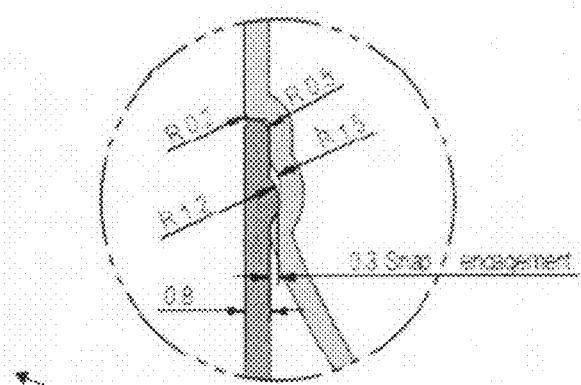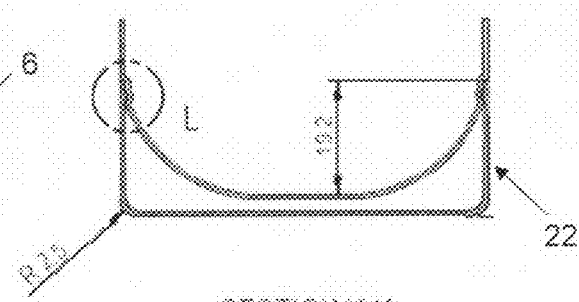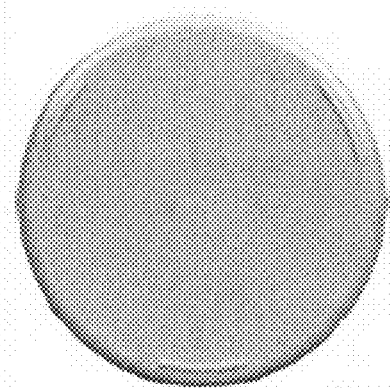
FIGURE 9(a)

FIGURE 18(a)
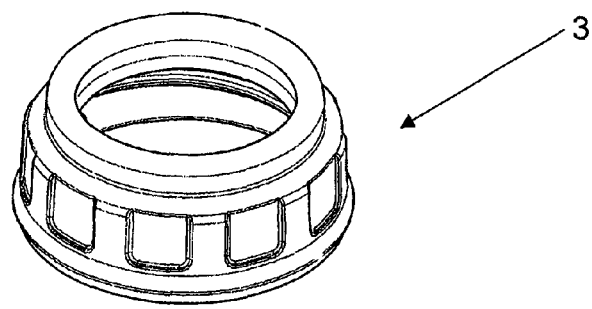
FIGURE 18(b)
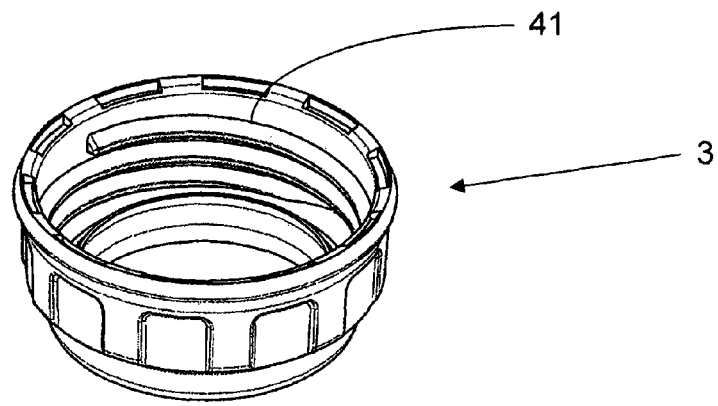
FIGURE 18(c)
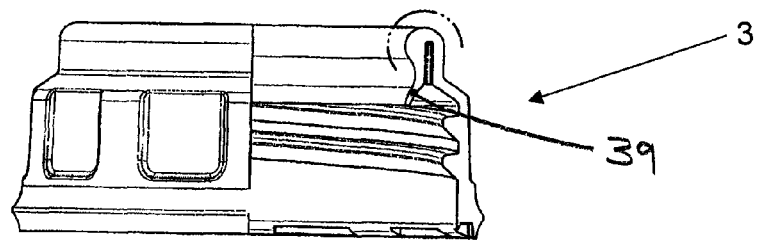
FIGURE 18

PLASTIC AEROSOL CONTAINER AND METHOD OF MANUFACTURING SAME

This application is a Continuation-In-Part of International PCT Application No. PCT/AU2006/001614, filed Oct. 27, 2006, and a Continuation-In-Part of International PCT Application No. PCT/AU2005/001474, filed Sep. 23, 2005, the contents of all listed applications being hereby incorporated in their entirety.

BACKGROUND OF THE INVENTION

The present invention relates to a container formed of plastics material, preferably PET, and which is adapted to dispense pressurised or aerosol products. The present invention also relates to a method of manufacturing such a container.

DESCRIPTION OF THE PRIOR ART

The reference in this specification to any prior publication (or information derived from it), or to any matter which is known, is not, and should not be taken as, an acknowledgement or admission or any form of suggestion that that prior publication (or information derived from it) or known matter forms part of the common general knowledge in the field of endeavour to which this specification relates.

Containers for dispensing pressurised products have been, to date, primarily constructed of metal. In particular, a metal body, of substantially cylindrical shape, is formed having a seam along its length. Metal end closures, one having a manually actuable valve device, are affixed to the ends of the cylindrical shape container, and crimped thereto.

Such metal containers have a number of inherent shortcomings. They are prone to rust when in contact with water and are prone to internal corrosion unless provided with an appropriate coating which is compatible with the product to be dispensed or the formulations to be dispensed are prepared in such a way as to prevent corrosion. In use, they are liable to become easily damaged, and/or, damage a substrate surface if they may be accidentally dropped thereon. This is particularly a problem when such containers are commonly used in household applications, and can be easily dropped on tiled surfaces, which may then be easily chipped or damaged.

The deficiencies of such prior art metal containers have resulted in some relatively unsuccessful efforts to replace the metal container with a container formed of plastics.

For example, U.S. Pat. No. 6,390,326 discloses an aerosol container in which is of plastics material, having a body and a shaped neck, formed by blow moulding a plastics preform. A metal collar is then mounted to the neck, and a valve device is engaged with the collar. The drawback of using such an arrangement is that, prior to supply of the product to be dispensed within the container body, the metal collar is required to be carefully placed to rest about the neck. As the container is transported to the packaging plant and/or along the assembly line for supply of a product thereinto, the metal collar is prone to be very easily bumped from its desired position, with the consequence that the valve device cannot then be properly attached thereto.

This therefore identifies a need for an improved aerosol container which has the advantage of being fabricated of plastics material, but which overcomes the disadvantages of such known prior art plastic containers.

SUMMARY OF THE INVENTION

The present invention seeks to provide a plastics aerosol container which overcomes the disadvantages of prior art aerosol containers.

The present invention seeks to overcome the disadvantages of the prior art by providing a collar which is formed of plastics material and which is attached to the neck of the body such that it does not become dislodged from its position during transport or during the filling process of the aerosol product, as happens with the device of U.S. Pat. No. 6,390,326.

The present invention also seeks to provide a plastics aerosol container which is substantially formed of recyclable plastics material, such as polyethylene terephthalate (PET).

The present invention also seeks to provide a method of manufacturing such a plastics aerosol container.

In one broad form, the present invention provides a container for dispensing a pressurised product, said container including:

a body, formed of PET or like plastics material, having a shaped neck about the opening;

a collar, formed of plastics material, shaped to fit said neck about said opening, said collar either being snap-fitted, screwed-on or otherwise attached to said neck about said opening, or, shaped to straddle internal and external walls of said opening to form a shaped lip therearound; and, a dispensing valve for attachment to said collar, said valve including an outer flange which is formed of malleable material and which is shaped to fit about and be retained to said collar by being compressed therearound.

In a further broad form, the present invention provides a container for dispensing a pressurised product, said container including:

a body, stretch blow moulded from polyethylene terephthalate (PET) or like plastics material, said body having a shaped neck surrounding an opening;

a collar, injection moulded from plastics material, shaped to be snap-fitted to said shaped neck of said body about said opening; and, a dispensing valve for attachment to said neck/collar, said valve including an outer flange which is formed of malleable material and which is shaped to fit about and be retained to said collar by being compressed therearound.

Preferably, said shaped neck includes an annular recess therearound, and, said collar includes an annular lip protruding inwardly therefrom, whereby said lip is adapted to cooperate with said recess such that said collar is snap-fitted to said neck of said body.

Alternatively or additionally, said neck may preferably include an outwardly disposed protrusion therearound, whereby said collar is adapted to be snap-fitted over said protrusion and be retained on said container.

In this preferred form, said protrusion is any one or more of a defined lip, an outward taper, or a gradual enlargement of diameter of said neck towards the upper portion thereof.

Preferably, the dispensing valve further includes a seal, formed of rubber or like material, positioned intermediate said neck and said flange, to prevent leakage of said product.

Also preferably, said body is provided with lid engaging means, for releasable engagement of a lid.

Also preferably, said body is provided with base engaging means, for a base to be attached thereto.

Also preferably, the container incorporates at least one strengthening rib therearound to provide structural rigidity to the container.

Preferably, said body is provided with a substantially cylindrical intermediate portion for application of a label thereto.

In a further broad form, the present invention provides a preform for making a container for dispensing a pressurised product, said preform being injection moulded from polyethylene terephthalate (PET) or like plastics material, said preform having a shaped neck, the extremity of which is adapted such that it can be supported in both a blow mould apparatus, and, in a cutting apparatus at a later stage of manufacture.

Preferably, said preform is thereafter used to be stretch blow moulded, have an injection moulded plastics collar, and, a dispensing valve attached thereto and be used to dispense a pressurised product.

In a further broad form, the present invention provides a method for manufacturing a container of the type for dispensing a pressurised product, said method including the steps of:

injection moulding a preform from polyethylene terephthalate (PET) or like plastics material, said preform including a shaped neck, the extremity of which is adapted to be supported in a stretch blow mould apparatus and later in the manufacturing process in said cutting apparatus;

stretch blow moulding said preform such that a container extends from said shaped neck;

cutting the extremity of said neck from said container such that said neck surrounds an opening;

snap-fitting an injection moulded plastics collar to said neck of said container in a position which surrounds said opening; and, installing a dispensing valve to said neck/collar, said valve including an outer flange which is formed of malleable material and which is shaped to fit about and be retained to said collar by being compressed therearound.

Preferably, said neck is tapered outwardly, such that, when the extremity of the neck is cut, it acts to assist in the snap-fitting of said collar thereto.

Preferably, prior to said valve installing step, said product is provided within said container, and then, after said dispensing valve is installed, said product is pressurised within said container.

Also preferably, the method further includes one or more of the steps of:

releasably attaching a lid to an upper portion of said body;
engaging a base to a lower portion of said body; and,
applying a label to an intermediate portion of said body.

In a further broad form, the present invention provides a container for dispensing a pressurised product, said container including:

a body, formed of PET or like plastics material, having a shaped neck about an opening;

a collar, shaped to straddle external and internal walls of said opening to form a shaped lip therearound, and, be attached to said body; and, a dispensing valve for attachment to said collar, said valve including an outer flange formed of malleable material and which is shaped to straddle said lip and be retained thereto by being compressed therearound.

Preferably, said external wall of said shaped neck includes a recess therearound, and said collar includes an annular protrusion extending inwardly therefrom, such that said protrusion cooperates with said recess, such that said collar is snap-fitted to said neck of said body.

Alternatively, but also preferably, said external wall of said shaped neck includes an annular protrusion therearound, and said collar includes an annular recess on its inside wall, such that said protrusion cooperates with said recess, such that said collar is snap-fitted to said neck of said body.

In yet another alternatively but also preferred form, said collar and said shaped neck are provided with cooperating screw threads, such that said collar may be screwed on to said neck of said body.

Preferably, said collar is formed of PET or like plastics material.

Also preferably, one or more strengthening ribs (protruding internally and externally) are provided therearound.

Preferably, said body is provided with lid engaging means, for releasable engagement of a lid.

Also preferably, said body is provided with base engagement means, for a base to be attached thereto.

BRIEF DESCRIPTION OF THE DRAWINGS

The present invention will become more fully understood from the following detailed description of preferred but non-limiting embodiments thereof, described in connection with the accompanying drawings, wherein:

FIG. 1 illustrates, in FIG. 1(a) thereof, a cross-sectional view of a plastics aerosol container, formed in accordance with the preferred embodiment of the present invention, whilst

FIG. 6 illustrates a detailed views of the collar of in FIG. 3, FIG. 6(a) showing a detailed cross-sectional view, whilst FIG. 6(b) shows an isometric view of the collar;

FIG. 7 illustrates various arrangements of caps or closures, FIGS. 7(a)(i), 7(b)(i) and 7(c)(i) showing elevational views of the various caps or closures, FIGS. 7(a)(ii), 7(b)(ii) and 7(c)(ii) showing sectional views along lines D, E and F, whilst FIGS. 7(a)(iii), 7(b)(iii) and 7(c)(iii) show details of portions H, I and J;

DETAILED DESCRIPTION OF PREFERRED EMBODIMENT

Throughout the drawings, like numerals will be used to identify similar features, except where expressly otherwise indicated.

Figures 1A, 1B:
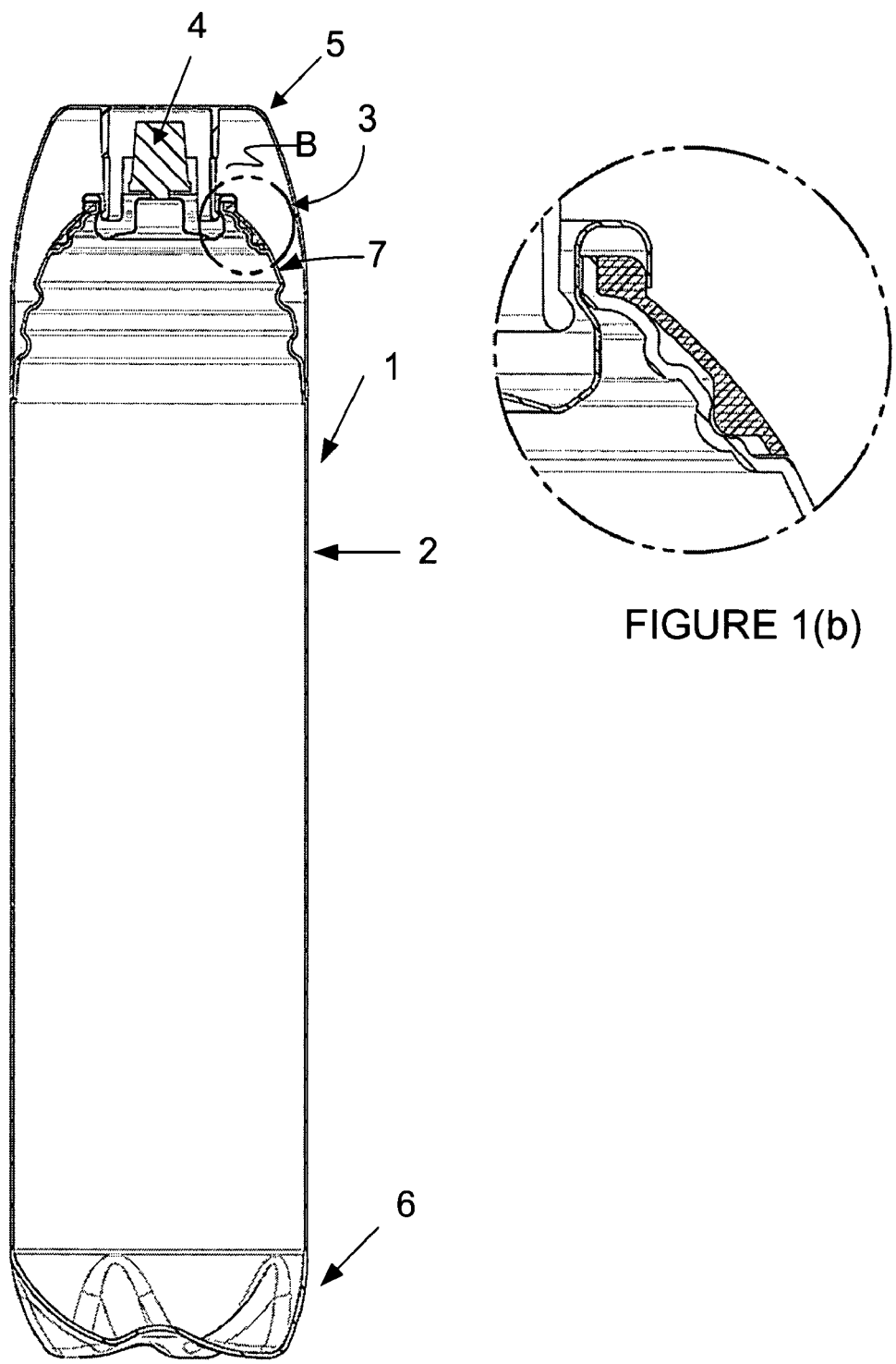
FIG. 1(b) illustrates an enlarged view of the encircled portion marked B in FIG. 1(a)

As shown in FIG. 1, a container, generally designated by the numeral 1, is formed of plastics material and has a body portion 2, a collar 3, a valving mechanism 4, and a cap or closure 5.

Figure 8:
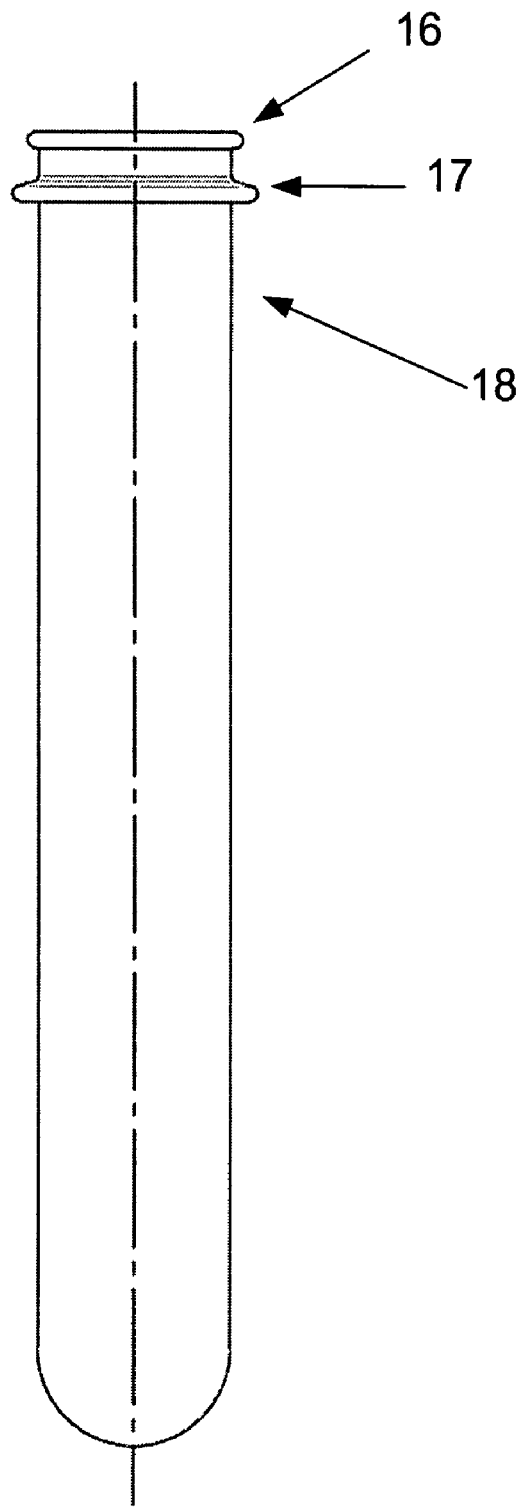
FIG. 8 illustrates a pre-form, prior to stretch blow moulding of the body of the container; and, FIG. 9 illustrates, in various arrangements of the base of the container, FIGS. 9(a) and 9(b) showing a champagne base with cap, whilst

The body portion 2 is formed to have a base 6 at a first end thereof, and a neck portion 7 at a second end thereof. The body 2, including its base and neck portion, are all integrally formed by stretch blow moulding plastics material, such as polyethylene terephthalate (PET) from a preform, such as shown in FIG. 8.

Figure 2A:
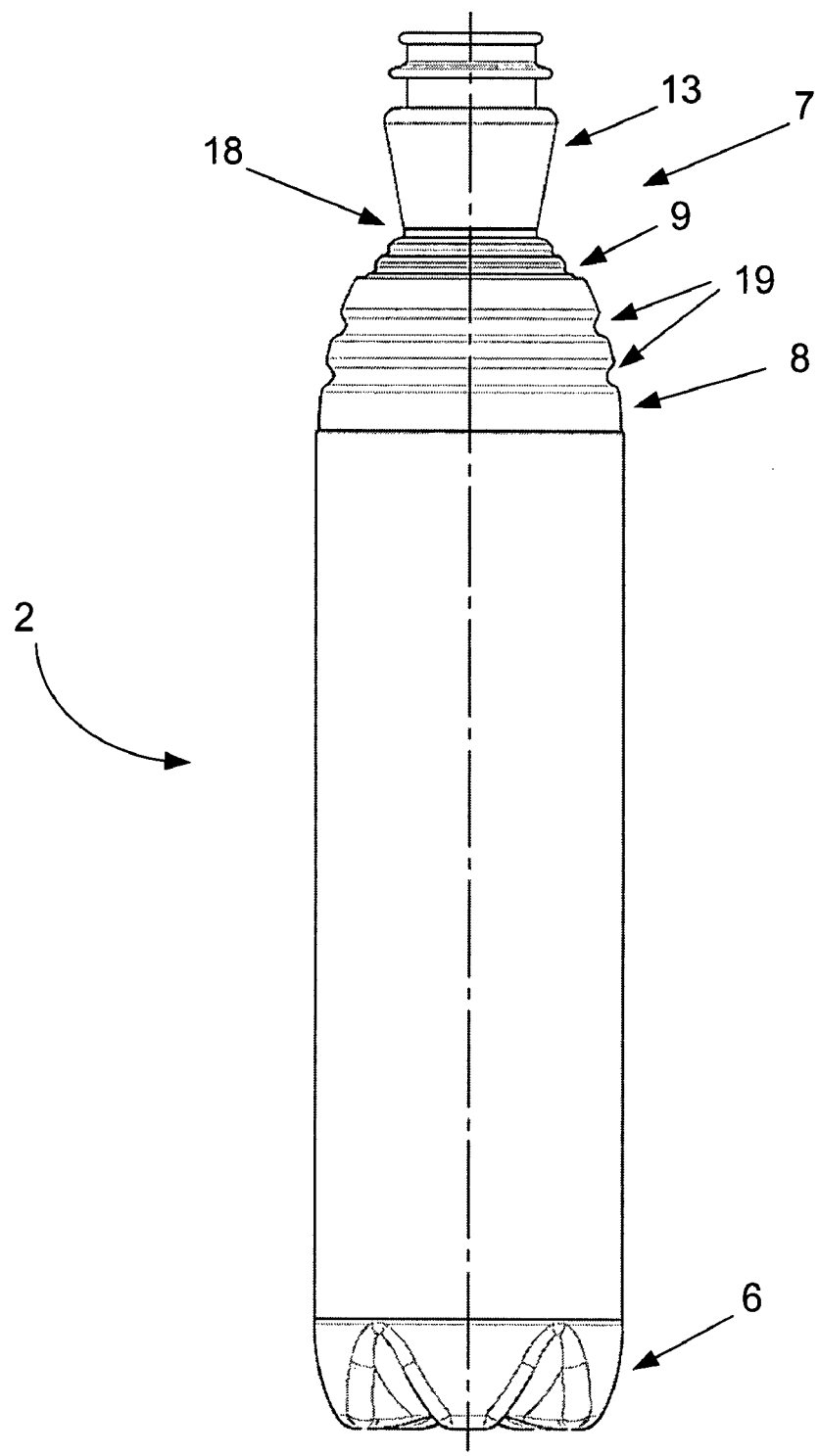
FIG. 2 illustrates elevational views of the body of the container, FIG. 2(a) showing the container prior to the neck trimming step, and, FIG. 2(b) showing the container after the neck trimming step.
Figure 2B:
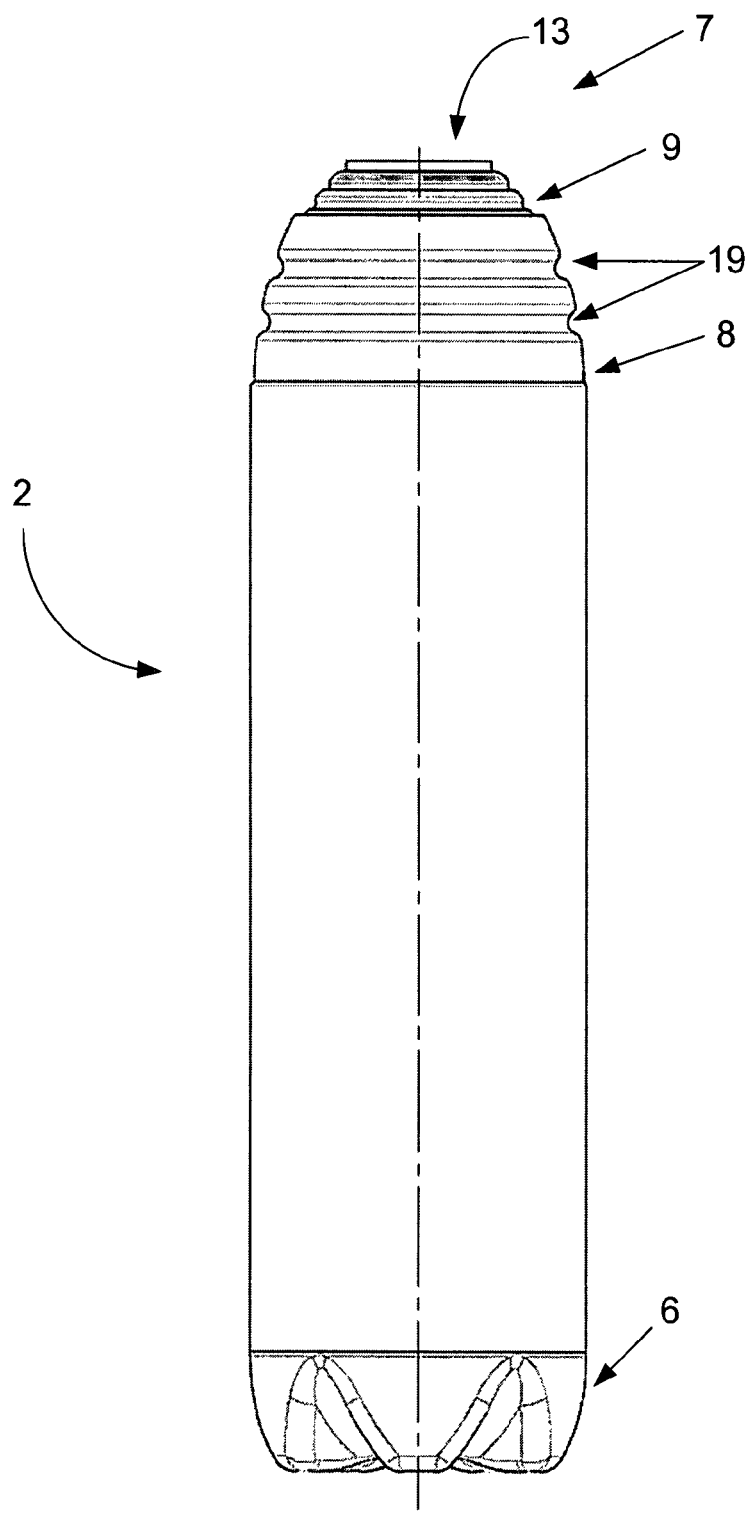
Figure 3:
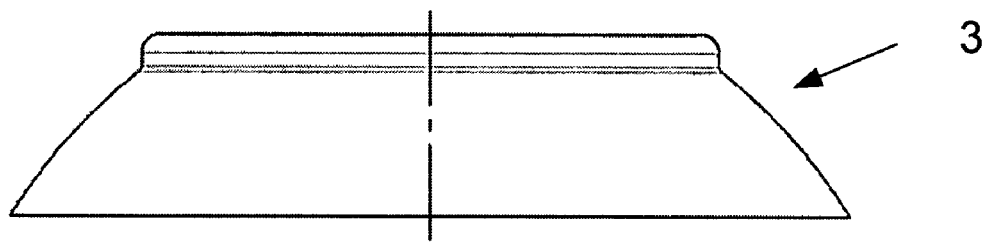
FIG. 3 illustrates an elevational view of a first preferred embodiment of a collar for the container.

FIG. 2(a) shows the container after blow moulding but before the neck is trimmed, whilst FIG. 2(b) shows the same container after the neck is trimmed. It will be noted from the elevational view of the body portion 2, illustrated in FIG. 2, that the upper or neck portion 7 of the body of the container is formed having various discrete features including a rebated portion 8 to which the cap 5 may be neatly fitted to the container, an annular recess 9 to which the collar 3, shown in FIG. 3, is adapted to engage, and one or more ribs 19 (either outwardly or inwardly protruding) which may act as alternative engagement points for the cap or closure or other components and/or as strengthening ribs to provide structural rigidity to the container, particularly when pressurised. An opening 10 is formed in the top of the neck 7, to receive the dispensing valve (described hereinafter).

The collar, illustrated by reference numeral 3, in FIGS. 3 and 6, is formed by injection moulding from plastics material, and is shaped to preferably be snap-fitted to the shaped neck of the body 2 about the opening 10. This is formed by the provision of an annular recess 9 on the neck of the body, which is adapted to engage an annular lip protruding inwardly from the inner surface of the collar 3, perhaps best illustrated in FIG. 6(a). The collar is preferably formed of plastics material and has the characteristics of being strong and rigid with some degree of flexibility, such that it provides strength to the neck 7 of the body 2, which is important when housing a pressurised product, whilst having some degree of flexibility to enable it to be snap-fitted to the neck 7 of the body 2. Suitable materials will become apparent to persons skilled in the art.

Figure 4:
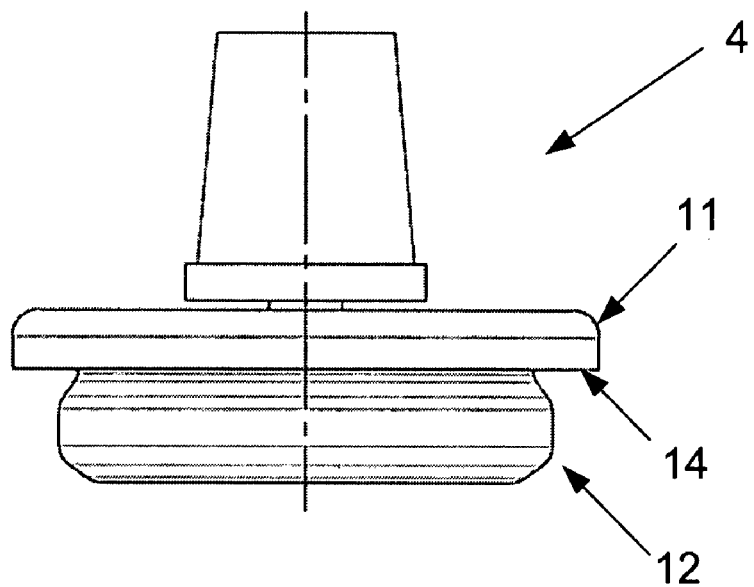
FIG. 4 illustrates an elevational view of a dispensing valve.

Once the collar 3 is positioned about the neck 7, a dispensing valve 4, as illustrated in FIG. 4, may be attached by being compressed therearound. The dispensing valve is of the conventional type of dispensing valve used in prior art metal aerosol containers. It is preferably formed of metal or like malleable material, and provided with an outer flange 11 which is shaped to fit about and be retained to the collar 3 by being compressed therearound. The lower portion 12 of the dispensing valve is adapted to fit within the opening 10 of the container 2.

It should be noted that the upper portion 13 of the neck of the container 2 may be provided with an outwardly disposed protrusion, formed by a defined lip, an outward taper and/or gradual enlargement of the neck, such that, when it is cut (as shown in FIG. 2(b)), there is a slight outward protrusion, which the collar 3 can ride over in a manner to cause fitting of the collar 3 to the neck 13. In one embodiment, the upper portion of the neck may be cut from the preform in a way in which it slightly protrudes and the outer portion of the flange 11 can fit about the protruding neck 13. An annular recess 9 may alternatively or additionally be provided about the neck of the container 2, adapted to cooperate in snap-fitting engagement with the annular protrusion 15 provided on the inner surface of the collar 3.

Figure 5A:
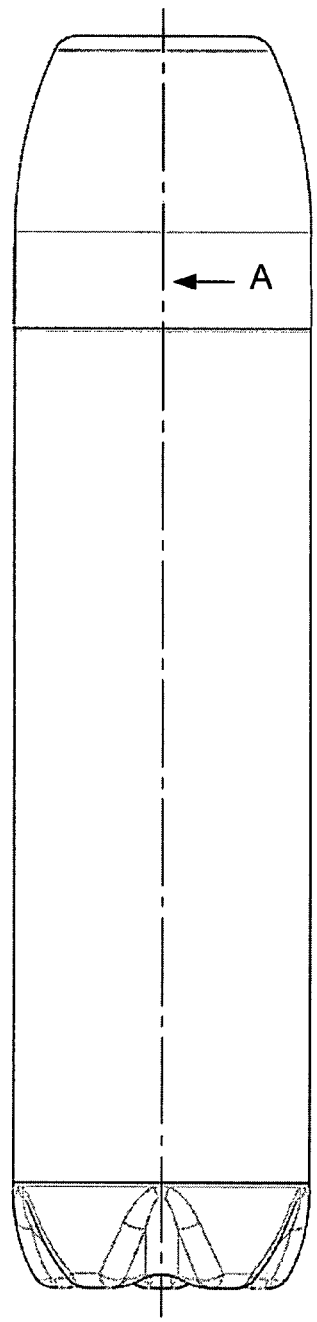
FIG. 5 illustrates, in FIG. 5(a) thereof, an elevational view of the container with its closure installed, whilst
FIG. 5(b) shows a cross-sectional detail along lines A-A of FIG. 5(a), and FIG. 5(c) details the portion labelled B in FIG. 5(b)
Figure 5B:
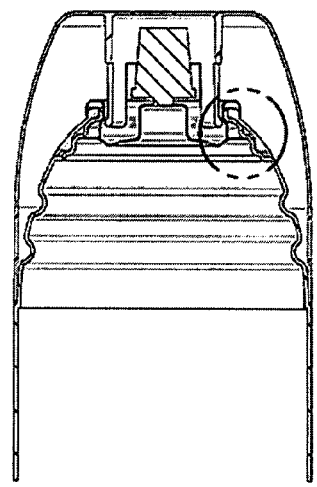
Figure 5C:
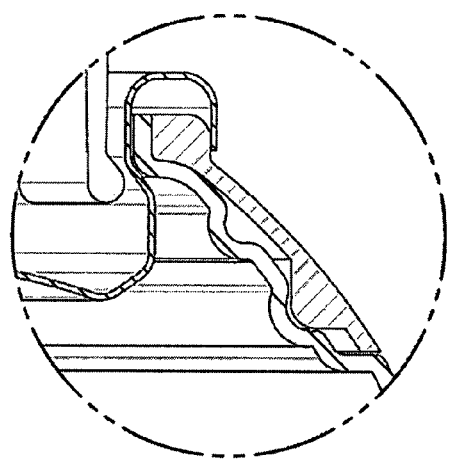

A seal 14 is also preferably provided between the engaging portions of the neck 13 and the dispensing valve 4, such as illustrated by reference numeral 14. This is provided to prevent leakage of the product between the collar and the neck. More detailed views of the body and the collar are shown in FIG. 5.

FIG. 7 illustrates various embodiments of caps, closures or lids 20, which may be engaged with an upper portion of the container 2. FIGS. 7(a)(i), 7(b)(i) and 7(c)(i) illustrate elevational views of various forms of caps which are of slightly different diameters and which engage slightly differently to the container. Specifically, the cap 20 of FIGS. 7(a) is of equivalent diameter to the container 2, and is engaged by finger(s) 21 contacting the neck of the container, whilst FIGS. 7(b) and 7(c) show how the cap 20 may engage a rib 19 provided on the upper portion of the container by an appropriately positioned lip 21.

FIG. 8 illustrates a preform, from which the container 2 of the present invention may be stretch blow moulded. It has a pair of annular protruding rings 16 and 17 therearound which are used for gripping purposes. Once the container is stretch blow moulded, the container shown in FIG. 2(a) is cut off at a position approximately indicated by reference numeral 18 to achieve the container shown in FIG. 2(b), the upper portion of the blow moulded preform then being discarded or recycled.

Figure 9B:
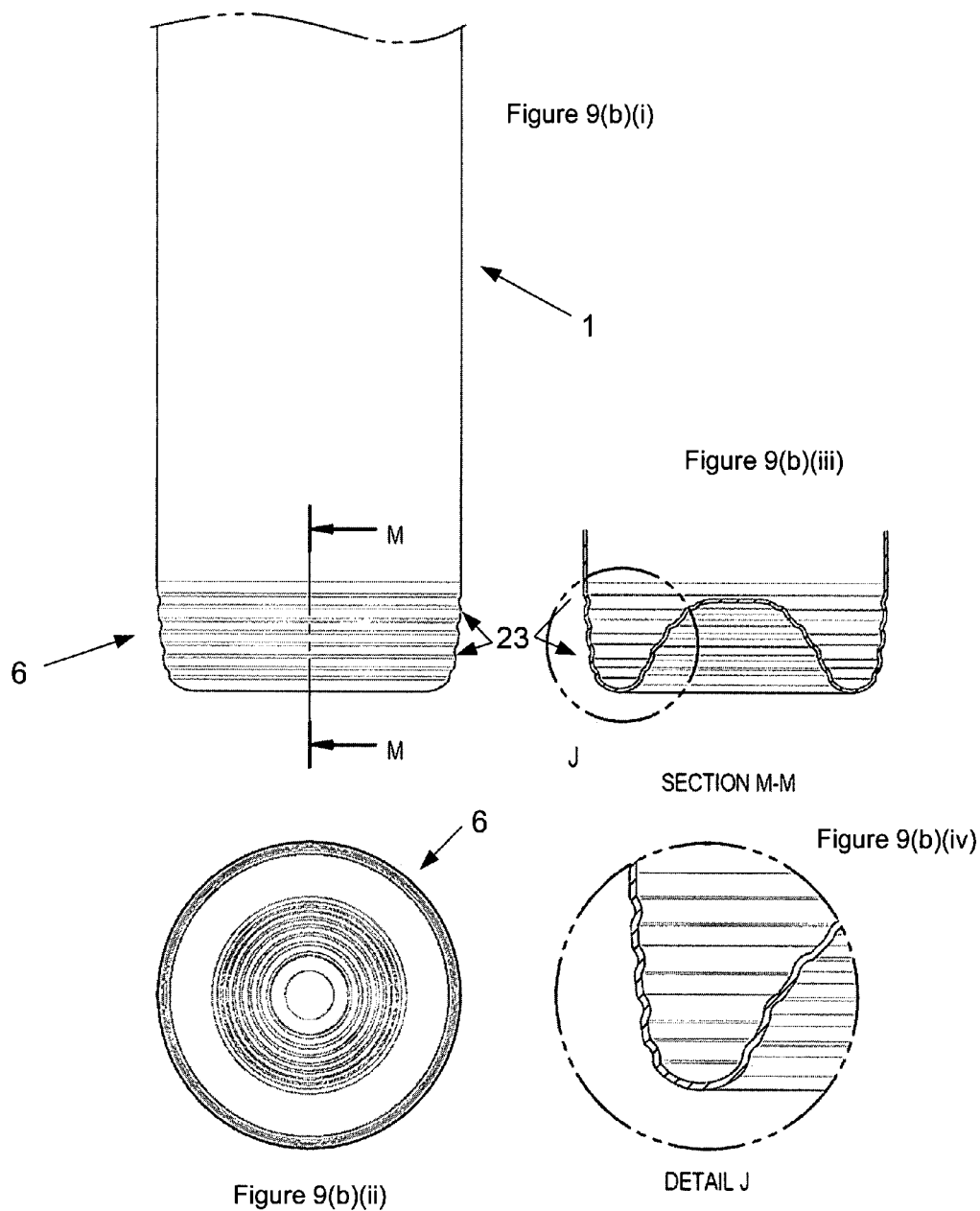
FIG. 9(c) shows a ribbed champagne base, FIGS. 9(a)(i) and 9(b)(i) showing elevational views, FIGS. 9(a)(ii) and 9(b)(ii) showing underside views, FIGS. 9(a)(iii) and 9(b)(iii) detailing cross-sectional views along lines K-K and M-M of FIGS. 9(a)(i) and 9(b)(i) respectively, and, FIGS. 9(a)(iv) and 9(b)(iv) show detailed enlargements of portions L and N of FIGS. 9(a)(iii) and 9(b)(iii), respectively.

FIG. 9 illustrates, in FIGS. 9(a) and 9(b), various alternative arrangements for the base 6 of the container 1. FIG. 9(a) shows a champagne base with a cap 22 being attached, by, for example, snap fitting to a suitable attachment, as best illustrated in FIG. 9(a)(iv). FIG. 9(b) illustrates an alternative arrangement, whereby the base is more simply formed as a ribbed champagne base, with strengthening ribs 23 appropriately positioned therearound.

It will be appreciated that the container hereinbefore described in the present invention has advantages over conventional type metal aerosol containers. It will also be appreciated that whilst particular embodiments have been hereinbefore described, variations and modifications may be made to the shape and configuration thereto, still achieving advantages to the invention. Such variations and modifications should be considered to be within the scope of the invention as hereinbefore described.

It would also be appreciated that the method of manufacturing the container has significant advantages over prior art methods of manufacturing aerosol type containers.

In the assembly of the container, it will be appreciated that firstly, a preform, such as shown in FIG. 8, is made by the process or injection moulding. The container is then stretch blow moulded from the preform, to achieve the container shown in FIG. 2(a). The top of the preform, that is, the extremity of the neck, can be cut, using a laser cutter, rotary knives or any other cutting mechanism. The cut portion may be discarded or recycled. The container with the extremity of the neck cut therefrom is shown in FIG. 2(b). A collar, such as shown in FIG. 3, may then be attached by snap fitting the collar to the top of the container. By the snap fitting of the collar to the container, the collar is not prone to be easily bumped off the top of the container during the on-going manufacturing/assembling process. This was a significant disadvantage of the metal collared prior art product shown in the aforementioned US Patent. That is, the metal collar of the afore mentioned US Patent simply rests atop the neck of the container and is liable to be easily bumped or removed during the filling/assembly process.

Once the collar is attached to the top of the container, product may be supplied into the container, and the dispensing valve, such as shown in FIG. 4, may be attached and compressed around the collar for securement thereto. A closure 20 may then be applied to the top of the container, such as shown in FIG. 7, as may a base, as shown in FIG. 9, and any associated labelling may then be applied to the plastics aerosol container.

Obviously the plastics aerosol container of the present invention will be capable of dispensing a variety of products, including all products known to be currently dispensed from metal aerosol containers. The plastics aerosol container, formed of PET material, however, has the significant advantage that it can be readily recycled, and is thus more environmentally friendly.

FIGS. 10 to 18 illustrate a second embodiment of the invention.

Figure 10:
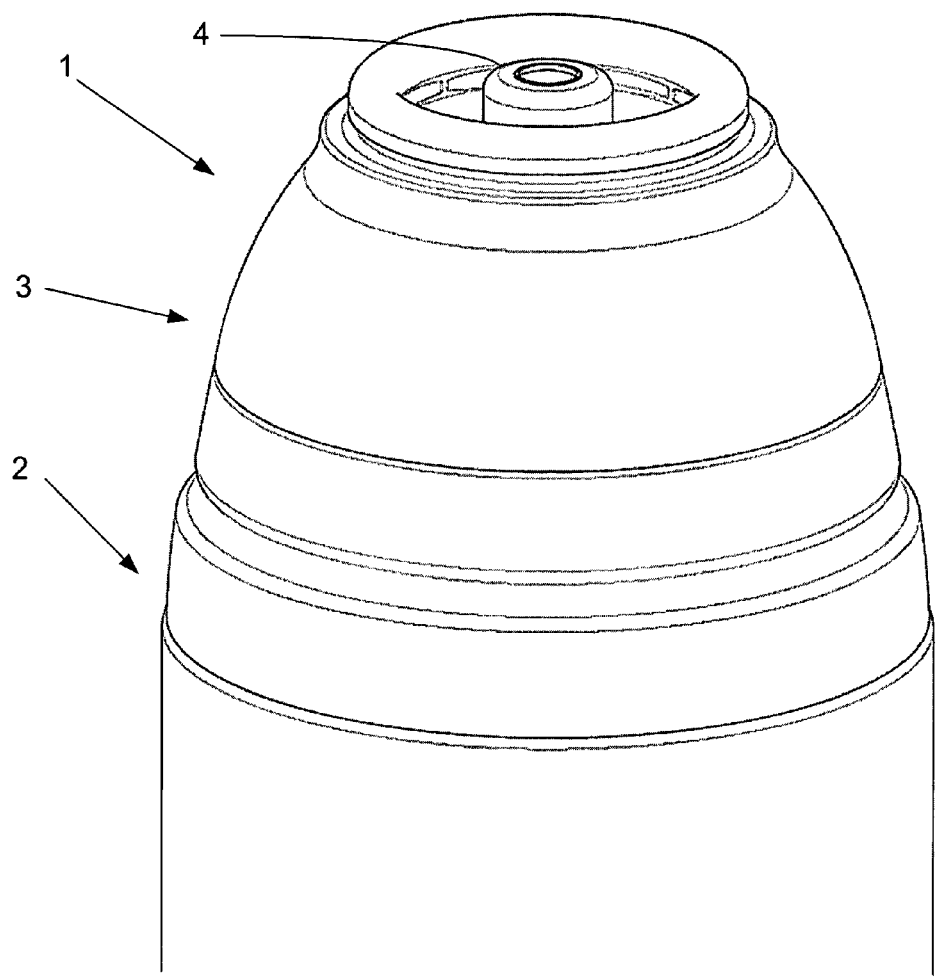
FIG. 10 illustrates a perspective view of the top of the plastics aerosol container formed in accordance with a second preferred embodiment of the present invention.
Figure 11:
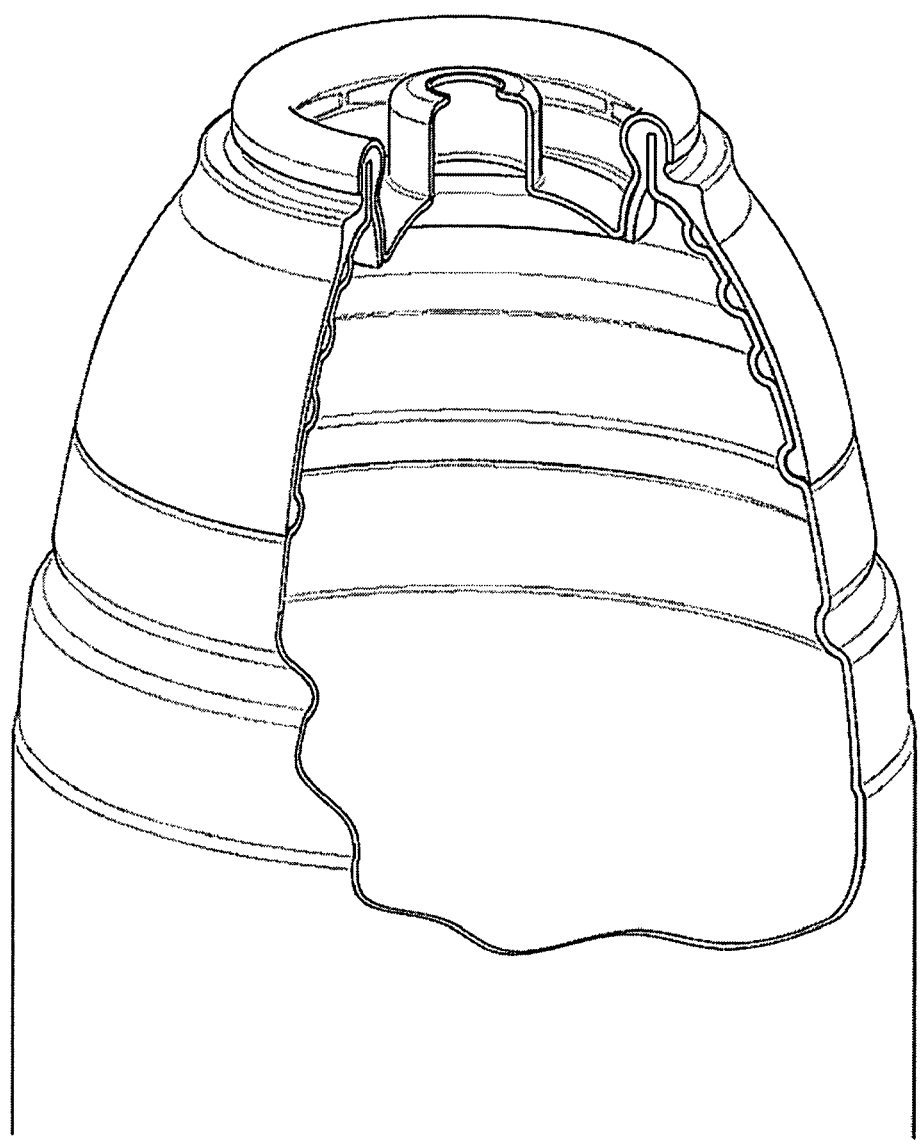
FIG. 11 illustrates a partially cut-away view of the plastics aerosol container shown in FIG. 10.

As shown in FIG. 10, a container generally designated by the numeral 1, is formed of plastics material, and has a body portion 2, a collar 3, and a valving mechanism 4.

Figure 12:
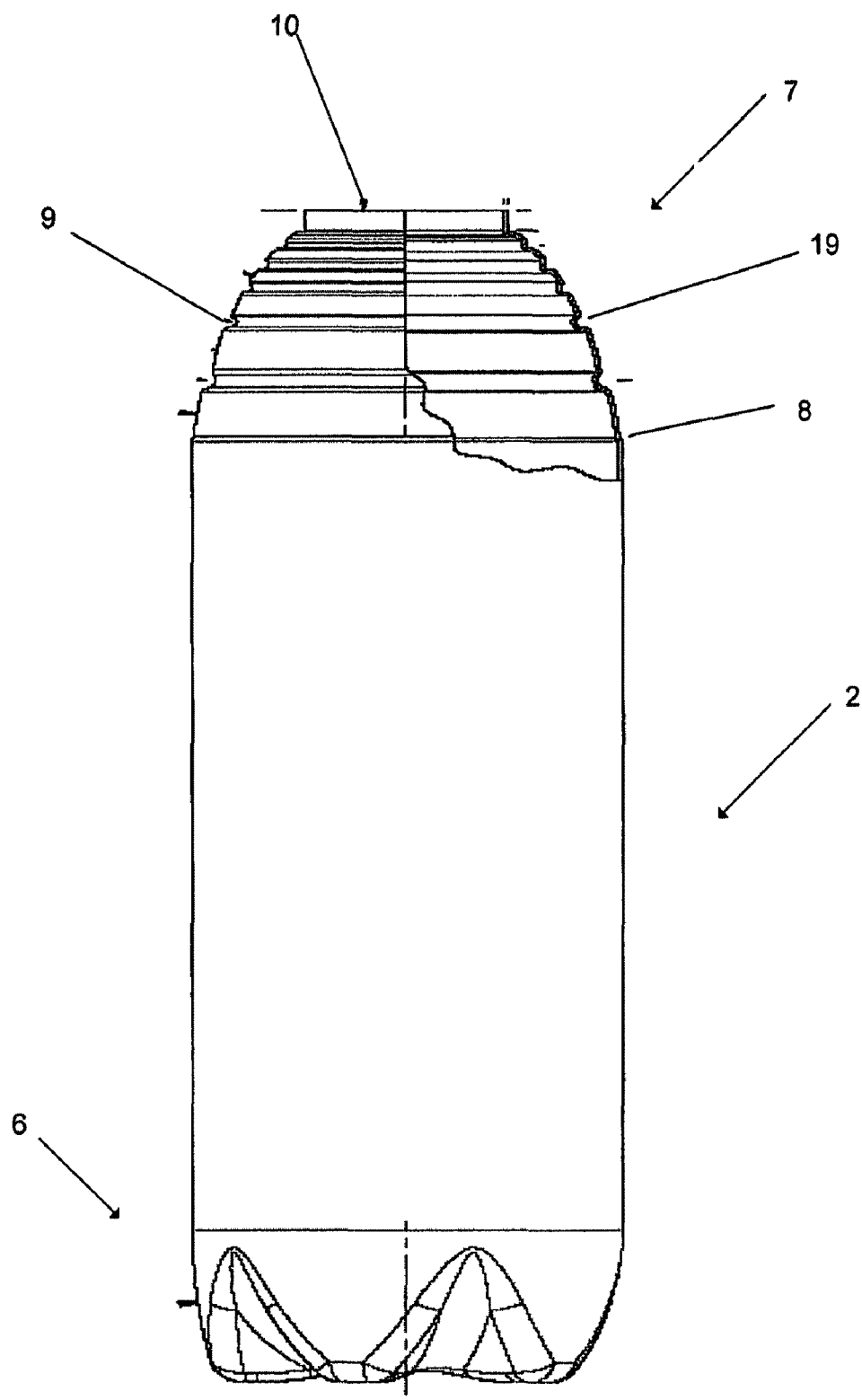
FIG. 12 illustrates an elevational view of a preferred embodiment of the container of the present invention.

The body portion 2, as perhaps best illustrated in FIG. 12, has a base 6 at a first end thereof, and a neck portion 7 at a second end thereof. The body 2, including its base and neck portions, are integrally formed by stretch blow moulding plastics material, such as a polyethylene terephthalate (PET) from a preform, as described hereinbefore. The body 3 may incorporate a rebated portion 8 to which a cap may be neatly fitted to the container, an annular recess 9 to which the collar 3 is adapted to engage, and one or more ribs 19, either outwardly or inwardly protruding, which may act as alternative engagement points for the cap or closure or other components, and/or as strengthening ribs to provide structural rigidity to the container, particularly when pressurised.

Figure 13:
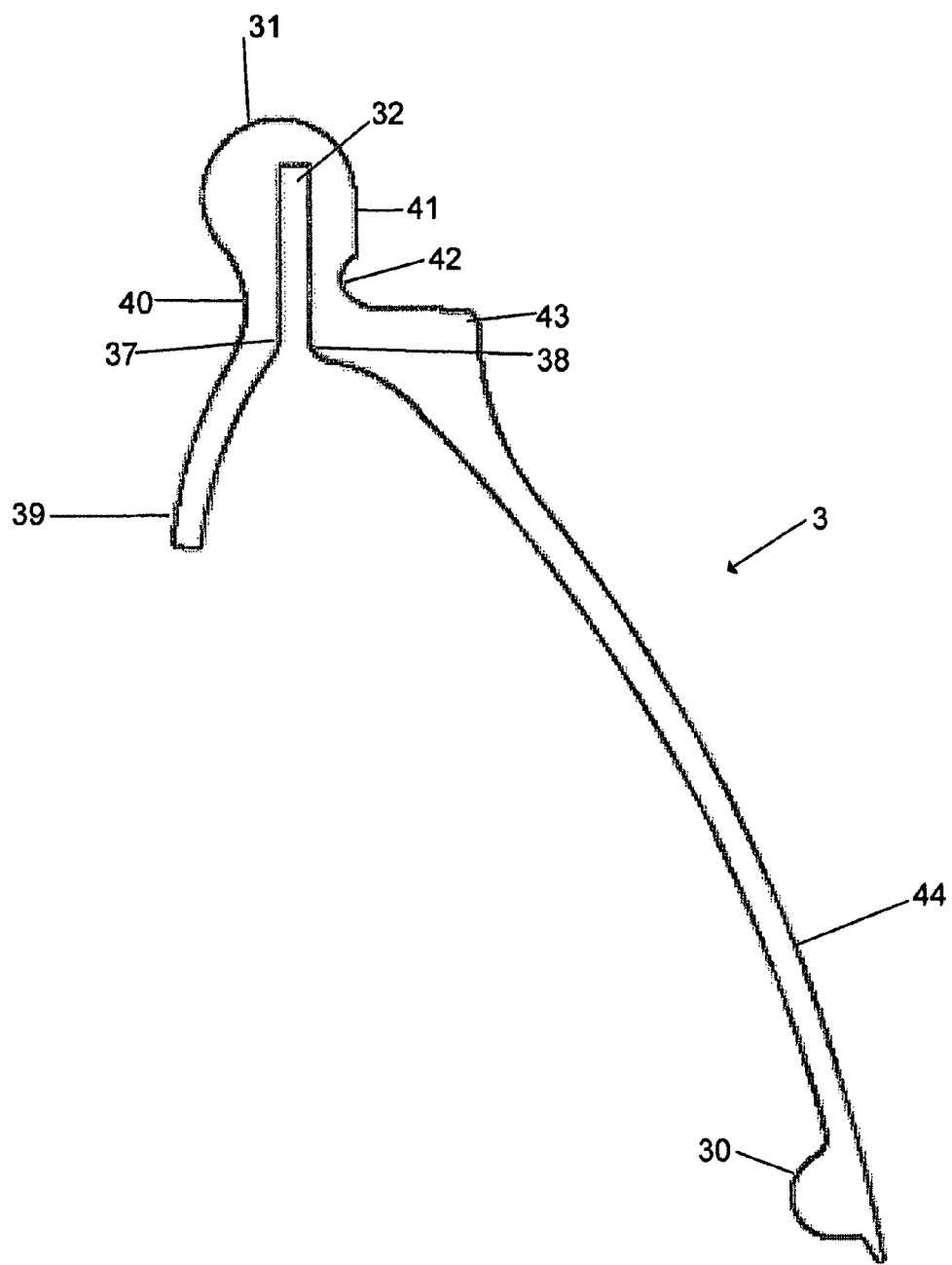
FIG. 13 illustrates a cross-sectional view of a second preferred embodiment of a collar for the container of the present invention.
Figure 14:
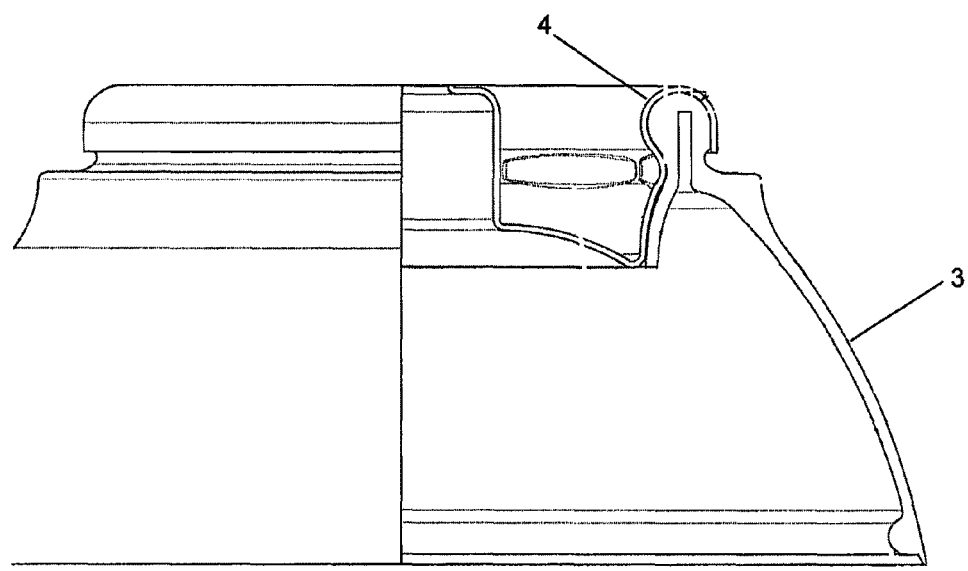
FIG. 14 illustrates a partially cut-away cross-sectional view of the top of the container in accordance with this second embodiment of the present invention.

An opening 10 is formed in the top of the neck 7, to receive the dispensing valve (described hereinafter). The collar, illustrated by reference numeral 3, is best illustrated in FIG. 13, and is formed by injection moulding from plastics and has the characteristics of being strong and rigid, with some degree of flexibility, such that it provides significant strength to the neck 7 of the body 2, which is important when housing a pressurised product, whilst having some degree of flexibility. FIG. 13 illustrates an embodiment wherein the collar 3 is snap-fitted to the neck 7 of the body 2. This is achieved by the provision of an annular recess 9 on the neck of the body which is adapted to engage an annular protrusion 30, which protrudes inwardly from the inner surface of the collar 3.

The collar 3 of this second embodiment is of different shape to the collar described in FIGS. 1 to 9. In particular, it will be noted that the collar 3 is shaped to straddle the internal and external walls of the opening 33 and 34, to form a shaped lip 31 therearound (the purpose of which will be described hereinafter).

The assembly of the collar, and thereafter the dispensing valve, onto the container is perhaps illustrated in FIG. 15.

Figure 15A:
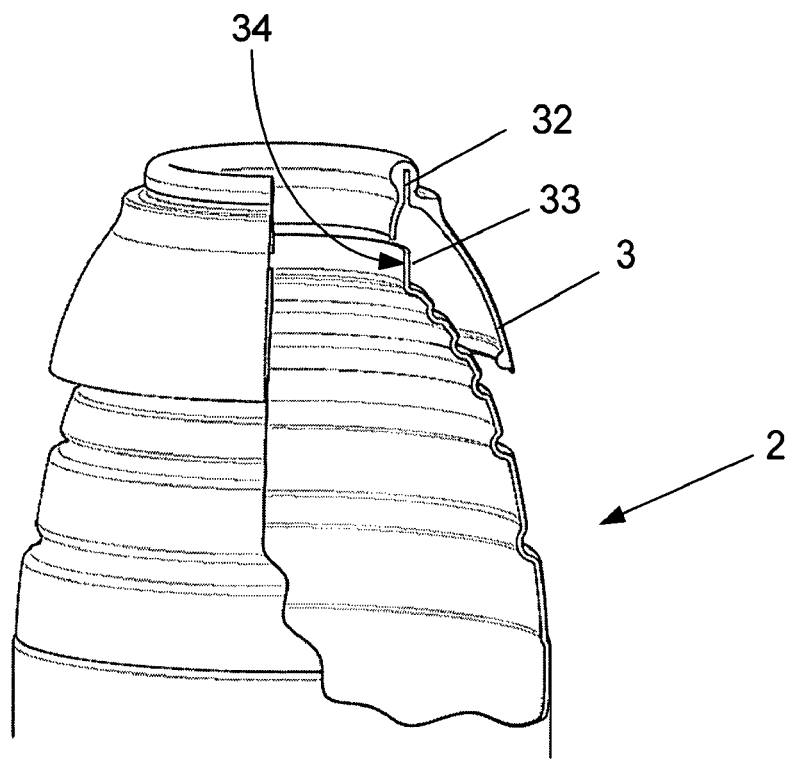
FIG. 15 illustrates, in FIGS. 15(a) to 15(e), various views during the assembly of the second embodiment of the collar to the container, and, thereafter the attachment of the dispensing valve to the container, in accordance with the present invention.

FIG. 15(a) shows how the collar 3 is installed on the container 2. As can be seen, the collar is lowered such that a groove 32 straddles the external and internal walls 33 and 34 of the opening of the container.

Figure 15B:
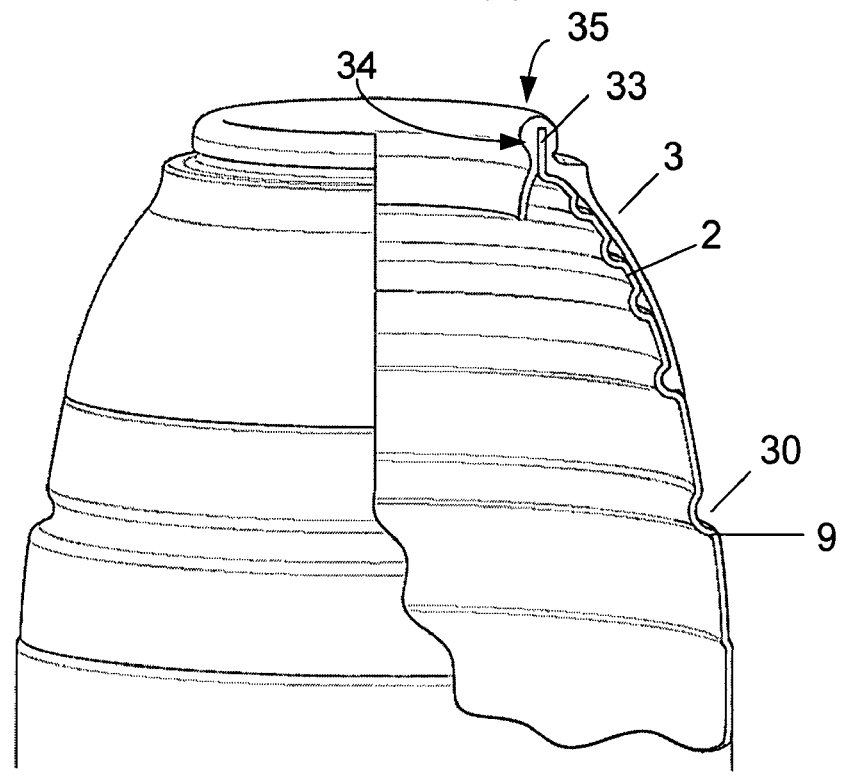

FIG. 15(b) shows the collar 3 installed on the container 2, whereby the annular protrusion 30 snap-fits into the rib 9, and, whereby the internal and external walls 34 and 33, respectively, are straddled by the collar 3 and whereby a shaped lip 35 is formed around the opening of the container.

Figure 15C:
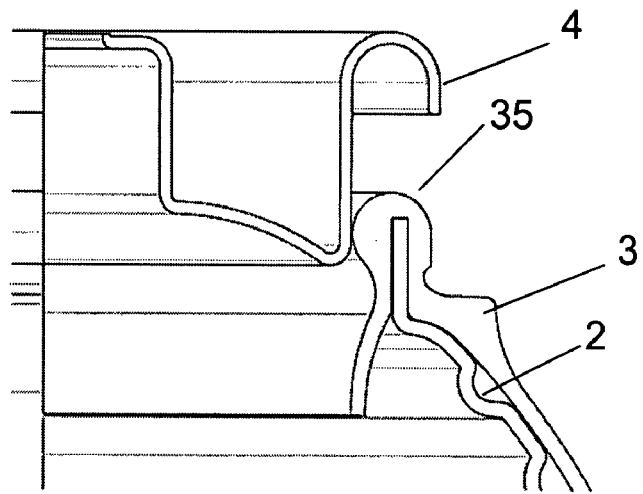

FIG. 15(c) shows how the dispensing valve 4 is thereafter installed about the shaped lip 35. The dispensing valve is preferably formed of malleable material, such as aluminium.

Figure 15D:
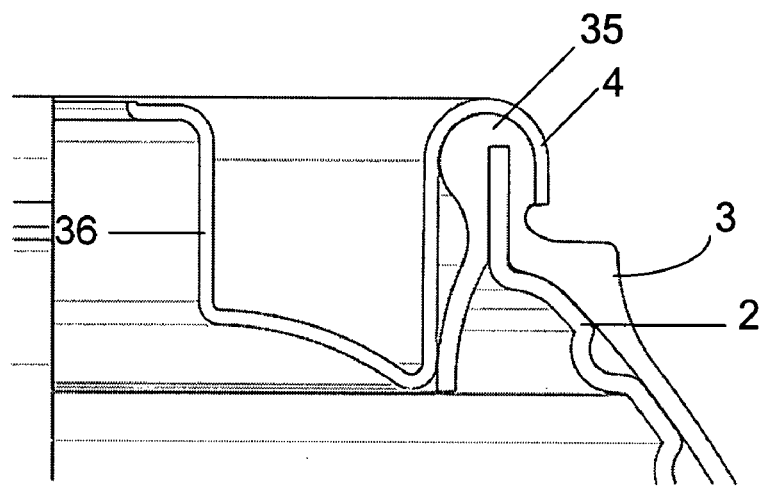

Once installed into the position shown in FIG. 15(d), the internal wall 36 may be compressed.

Figure 15E:
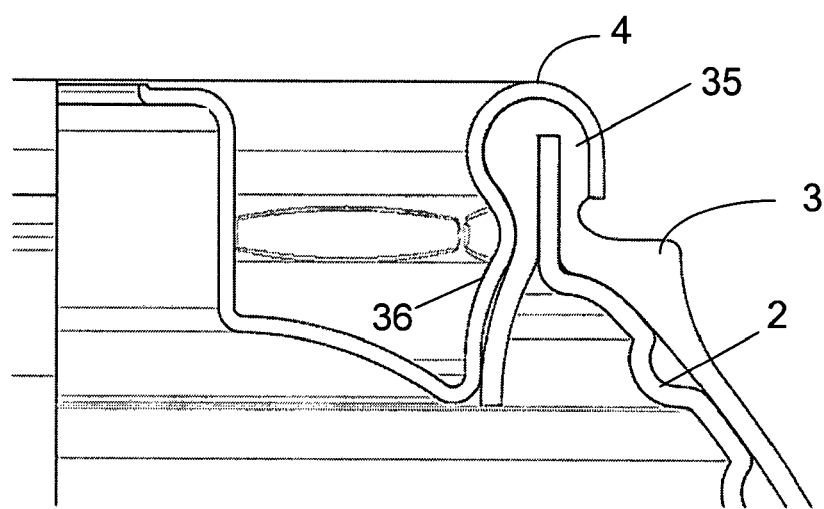

FIG. 15(e) shows the compressed position of the valve after being affixed to the collar/neck of the container 2.

Figure 16:
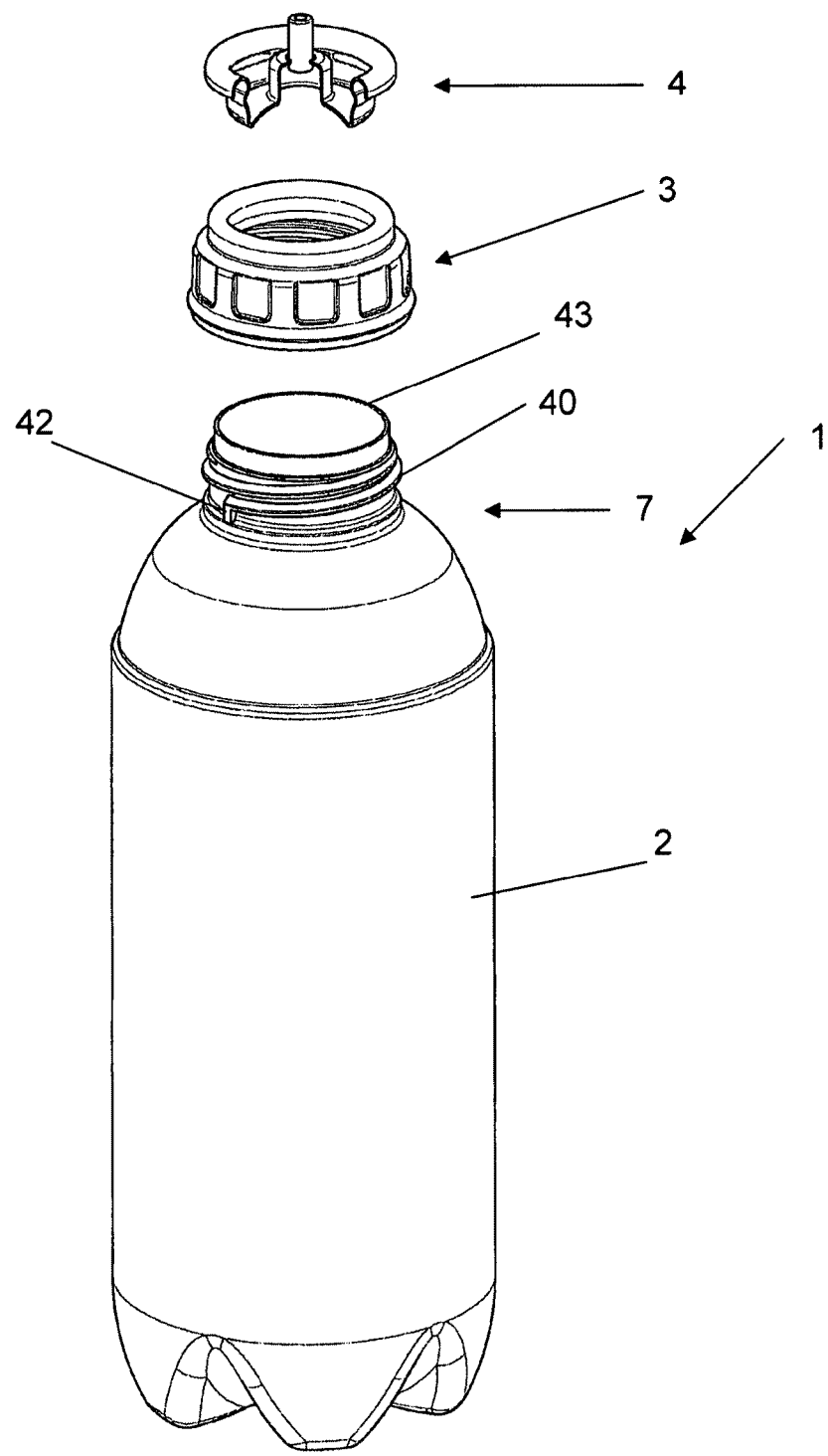
FIG. 16 illustrates an exploded view of a plastics aerosol container, having a screw on collar, in accordance with an alternatively preferred embodiment of the present invention.
Figure 17:
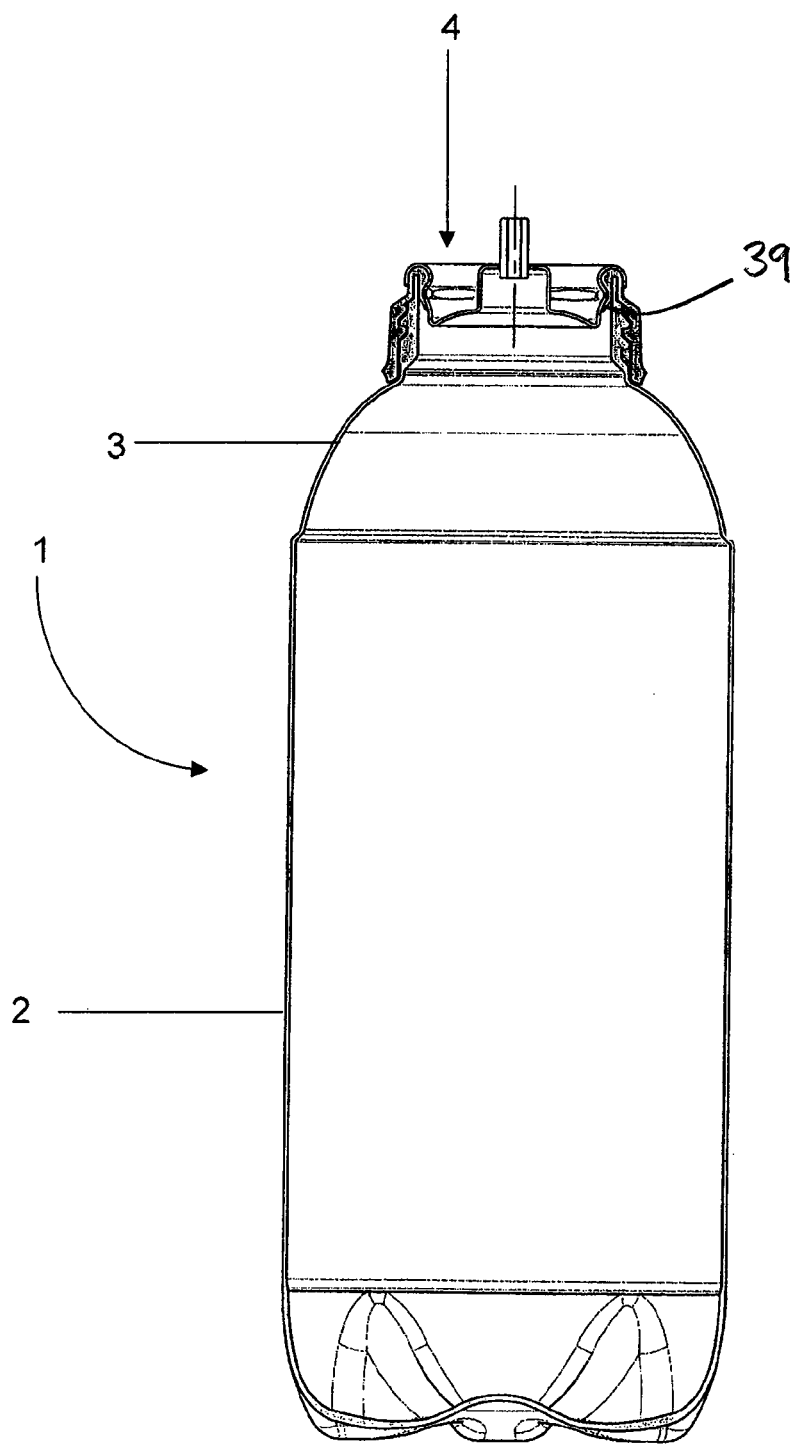
FIG. 17 illustrates a partially cut-away view of the plastics aerosol container of FIG. 16; and, FIG. 18 illustrates various views of the collar of the embodiment of FIGS. 16 and 17.

In FIGS. 16, 17 and 18 is shown an alternatively preferred embodiment of the present invention, utilising a screw cap collar 3, instead of the snap-fit collar of the previously described embodiments. As shown in FIGS. 16, 17 and 18, the neck portion 7 of the body 2 is provided with a screw thread 40, onto which the collar 3 may be secured. The collar 3, as best illustrated in FIG. 18, is provided with a complementary screw thread 41 compatible with the screw thread 40 of the neck 7 of the body 2. The screw thread 40 may be provided with a registration stop piece 42, which enables the collar 3 to be screwed onto the neck 7 until registered. An appropriate pinch seal may be provided around the periphery of the neck 7 as indicated by item 43, such that sealing occurs between the collar 3 and the neck 7. The collar 3 may be attached to the neck 7 of body 2 either manually or by machine. To avoid the collar 3 loosening, an adhesive may be applied to either or both of the screw threads 40 or 41 just prior to assembly, such that once the adhesive has set, the collar may not be removed. The valve 4 may thereafter be supplied to the collar 3 and be crimped thereto just as with the earlier embodiment hereinbefore described.

FIG. 17 illustrates the various components of this screw on collar container in their assembled position, with the upper components, namely the collar 3 and valve 4, partially cut away for ease of understanding.

It will be appreciated that by utilising a collar as herein described, a PET type aerosol container is formed which, due to this unique design of the collar shrouding the opening, is capable of holding a higher pressure than that of the prior art plastics containers. It still has the advantages that the collar will not separate from the container, particularly during the manufacturing process, as described in relation to FIGS. 1 to 9, due to the snap-fitting or screw-on engagement of the collar to the container.

It should be noted that the means by which the dispensing valve is attached to the lip 35 of the collar 3, enables a good seal to be created, such that the product provided within the container is not permitted to escape. It will be appreciated that additional sealing, by utilising, for example, flexible rubber material or the like between these components, may additionally be provided if desired.

It will be appreciated that the means by which the valves are crimped to the traditional metal prior art containers may be similarly used in the present invention. The rigidity of the collar utilised in the present invention permits this traditional type crimping tool to be utilised without breaking the PET container and components. It will appreciated by persons skilled in the art that crimping metal directly to PET does cause stress to the container, which, over time can cause the container to crack and cause leaking. However, by utilising the injection moulded collar in accordance with the present invention, this disadvantage does not occur.

The shoulder portions 37 and 38 (see FIG. 13), where the collar contacts the container during the assembly process, are preferably designed such that they allow for smooth entry therethrough, to minimise jamming as the components are assembled. Persons skilled in the art will recognise acceptable curvatures of these shoulders.

The arm 39 of the collar 3 acts as a guide during the assembly of the collar to the container, such that, if there is any misalignment, this may be corrected. Furthermore, when the valve is inserted into the container, the arm 39 assists in the assembly operation by pushing the flange to open up a small amount, such that this whole section then pinches the collar to the container, whilst it is in slot 32.

The slot 32, where the PET container is pinched by the portion 40 the collar 3, creates a secondary seal between the container and the collar. Under high pressure and heat, the PET container will give before the collar, allowing the gas to escape at the top of slot 32, therefore not allowing the container to explode. The slot 32 also protects the PET container from having any direct contact with the metal valve crimp area.

The exterior portion 41 of the lip 31 will be noticed to be slightly flattened, i.e. the lip does not continue to curl, such that various types of valve presently available on the market place can all be installed onto the lip 31 of the present invention.

The rebate 42 at the periphery of the lip 31 has been provided taking into consideration the various sprays available in the market place, noting that these special dispensing sprayers can be attached thereto to the container, if desired.

A strengthening shoulder 43 may be provided on the collar 3, to provide stiffening and/or increased strength, which may be particularly useful during the crimping process when forces are applied thereto.

The skirt 44 of the collar 3 is provided such that it gives an appealing visual appearance to the overall container, whilst the container below, hidden by this skirt 44 may still provides strengthening ribs, etc., for structural rigidity of the container.

It will be appreciated that the container described in the present invention has advantages over conventional type metal aerosol containers. It will be appreciated that, whilst particular embodiments have been hereinbefore described, variations and modifications may be made to the shape and configuration of the container, whilst still achieving the advantages of the invention. All such variations and modifications should be considered to be within the scope of the invention as hereinbefore described.

It will be appreciated that the method and manufacture of the second embodiment of the container is similar to that described in relation to the first embodiment, with the exception that the collar is differently formed to achieve the advantages hereinbefore described. That is, the collar may still be snap-fitted or screwed on to the top of the container and, due to its shrouding of the opening of the container, it is not prone to be bumped off the top of the container during the on-going manufacturing and assembly process.

Obviously the plastics aerosol container of the present invention will be capable of dispensing a variety or products, including all products known to be currently dispensed from metal aerosol containers. The plastics aerosol container, formed of PET material, however, has the significant advantage that it can be readily recycled, and is thus more environmentally friendly.

It will be appreciated that numerous variations and modifications may be made to the container and the method of manufacture of the container. All such variations and modifications should be considered to fall within the scope of the invention as broadly hereinbefore described and as hereinafter claimed.

The invention claimed is:

1. A container for dispensing a pressurised product, comprising:
    a blow-moulded body of integrally formed PET plastics material including a base and shaped neck defining an opening having external and internal walls;
    a collar having:
        a groove which straddles the external and internal walls of said opening and which forms a shaped lip therearound,
        a skirt snap fitted to said body and depending from an external portion of said shaped lip, and
        an arm depending from an internal portion of said shaped lip and guiding said collar into position about said opening; and
    a dispensing valve attached to said collar, said dispensing valve including an outer flange of malleable material which straddles around and compresses said lip and which pushes against said arm to thereby pinch said collar to said container, said flange sealingly engaging said body, collar, and valve together.

2. The container of claim 1, wherein an external wall of said shaped neck includes a recess therearound, and
    said skirt of said collar includes an annular protrusion extending inwardly therefrom,
    such that said protrusion cooperates with said recess and snap fits to said neck of said body.

3. The container of claim 1, wherein an external wall of said shaped neck includes an annular protrusion therearound, and
    said skirt of said collar includes an annular recess on its inside wall,
    such that said protrusion cooperates with said recess and snap fits to said neck of said body.

4. The container of claim 1, wherein said collar and said shaped neck are provided with cooperating screw threads, such that said collar is screwed onto said neck of said body.

5. A container for dispensing a pressurized product, comprising:
    a blow moulded body of integrally formed PET plastics material including a base and a shaped neck defining an opening having external and internal walls;
    a collar having:
        a groove which straddles the external and internal walls of said opening and which forms a shaped lip therearound,
        a skirt screwed to said body and depending from an external portion of said shaped lip, and
        an arm depending from an internal portion of said shaped lip and guiding said collar into position about said opening; and
    a dispensing valve attached to said collar, said dispensing valve including an outer flange of malleable material which straddles around and compresses said lip and which pushes against said arm to thereby pinch said collar to said container, said flange sealingly engaging said body, collar, and valve together.

* * * * *